US010532509B2

(12) United States Patent
Horigome et al.

(10) Patent No.: US 10,532,509 B2
(45) Date of Patent: Jan. 14, 2020

(54) BIAXIAL STRETCHING AND BLOW MOLDING DEVICE

(71) Applicant: NISSEI ASB MACHINE CO., LTD., Komoro-shi, Nagano (JP)

(72) Inventors: Hiroshi Horigome, Komoro (JP); Yuji Sakabe, Komoro (JP); Shou Komiyama, Komoro (JP)

(73) Assignee: NISSEI ASB MACHINE CO., LTD., Komoro-shi, Nagano (JP)

( * ) Notice: Subject to any disclaimer, the term of this patent is extended or adjusted under 35 U.S.C. 154(b) by 295 days.

(21) Appl. No.: 15/706,542

(22) Filed: Sep. 15, 2017

(65) Prior Publication Data

US 2018/0001539 A1  Jan. 4, 2018

Related U.S. Application Data

(63) Continuation of application No. PCT/JP2016/058319, filed on Mar. 16, 2016.

(30) Foreign Application Priority Data

Mar. 18, 2015 (JP) .................................. 2015-055264

(51) Int. Cl.
 *B29C 49/12* (2006.01)
(52) U.S. Cl.
 CPC ...... *B29C 49/12* (2013.01); *B29C 2049/1204* (2013.01); *B29C 2049/129* (2013.01); *B29C 2049/1257* (2013.01)
(58) Field of Classification Search
 CPC ............ B29C 49/12; B29C 2049/1204; B29C 2049/1257; B29C 2049/129; B29C 2049/1252
 See application file for complete search history.

(56) References Cited

U.S. PATENT DOCUMENTS

| | | | | |
|---|---|---|---|---|
| 4,409,161 A | * | 10/1983 | Harry ..................... | B29C 49/28 264/40.1 |
| 5,169,705 A | * | 12/1992 | Coxhead ................. | B29C 49/12 425/150 |
| 2009/0274789 A1 | * | 11/2009 | Kobayashi .......... | B29C 45/1769 425/533 |

FOREIGN PATENT DOCUMENTS

| | | | | |
|---|---|---|---|---|
| CA | 2508450 A1 | * | 6/2004 | ............. B29C 49/06 |
| CN | 202742661 | | 2/2013 | |

(Continued)

OTHER PUBLICATIONS

Supplementary European Search Report dated Oct. 22, 2018 by the European Patent Office in corresponding European Patent Application No. 16765018.3.

(Continued)

*Primary Examiner* — Robert B Davis
(74) *Attorney, Agent, or Firm* — Finnegan, Henderson, Farabow, Garrett & Dunner, L.L.P.

(57) ABSTRACT

A biaxial stretch blow molding device comprises: a first guide shaft 57 which is erected on an upper base 51 and to which a blow core fixing member 54 is slidably coupled; a second guide shaft 67 erected on the stretch rod fixing member 56; a support member 59 fixed to the first guide shaft 57 and provided with a guide hole 68 through which the second guide shaft 67 is slidably inserted; a first drive device 63 that moves the blow core fixing member 54 forward and backward independently of the stretch rod fixing member 56; and a second drive device 70 that moves the stretch rod fixing member 56 forward and backward independently of the blow core fixing member 54.

12 Claims, 5 Drawing Sheets

(56) References Cited

FOREIGN PATENT DOCUMENTS

| | | |
|---|---|---|
| CN | 202742661 U | 2/2013 |
| JP | 06-254955 | 9/1994 |
| JP | 3391904 | 1/2003 |
| JP | 2004-209785 | 7/2004 |
| JP | 2013-539726 | 10/2013 |
| WO | WO 1998/003324 A1 | 1/1998 |
| WO | WO 00/74923 A1 | 12/2000 |
| WO | WO 2012/051368 A2 | 4/2012 |

OTHER PUBLICATIONS

International Search Report from the Japan Patent Office for International Application No. PCT/JP2016/058319, dated Jun. 21, 2016.
Chinese Office Action dated Nov. 30, 2018 issued by the Chinese Patent Office in counterpart Chinese Application No. 201680016357.6.

* cited by examiner

BIAXIAL STRETCHING AND BLOW MOLDING DEVICE

This application is a Continuation of PCT International Application No. PCT/JP2016/058319, filed on Mar. 16, 2016, which claims priority under 35 U.S.C. 119(a) to Patent Application No. 2015-055264, filed in Japan on Mar. 18, 2015, all of which are hereby expressly incorporated by reference into the present application.

TECHNICAL FIELD

This invention relates to a biaxial stretch blow molding device which blow-molds a preform while stretching it by a stretch rod to form a hollow container.

BACKGROUND ART

Biaxial stretch blow molding devices have so far been known as devices for producing hollow containers made of synthetic resins, such as plastic containers. In the biaxial stretch blow molding device, it is common practice that a preform is transported to a blow mold by a rotating disk, with a neck of the preform being held; the preform is stretched by a stretch rod within the blow mold; and high pressure air is fed into the preform via a blow core mold for closing a mouth (opening) of the preform, whereby a hollow container is blow-molded. In this manner, a hollow container of a desired shape can be formed.

The biaxial stretch blow molding device is configured, for example, as follows: A core fixing plate to which a blow core mold is fixed is raised or lowered (moved forward or backward), together with an elevation block, by a first air cylinder provided fixed block. An elevation plate to which a stretch rod is fixed is raised or lowered by a second air cylinder provided in the elevation block (see, for example, Patent Document 1).

In forming a hollow container such a biaxial stretch blow molding device, the stretch rod is moved (lowered) by the second air cylinder, with the movement (e.g., descent) of the blow core mold being stopped. Since air is compressed or expanded, it is difficult to exercise fine control of speed simply by the air cylinder. Thus, if it is attempted to operate the first air cylinder and the second air cylinder synchronously in the device described in Patent Document 1, for example, deviation between their timings may exert an influence to induce damage to the device.

Generally, in order that the stretch rod has been inserted to a site near the bottom of the preform at the completion of the movement (descent) of the blow core mold, the stretch rod is lowered beforehand to a predetermined position conformed to the length of the preform, at a standby (ascent) position before descent of the blow core mold. That is, at the standby position, the stretch rod is protruded with a predetermined length below the blow core mold. By so doing, a cycle time taken for blow molding can be shortened.

In this case, however, in order to avoid interference between the stretch rod and the rotating disk for transporting the preform, there is need to set a position upwardly apart from the rotating disk by an amount, which is equal to or more than the amount of protrusion of the stretch rod from the blow core mold, as the standby position of the blow core mold.

To close the neck mold for the preform with the blow core mold, therefore, it is necessary to lower the blow core mold by at least a distance corresponding to the amount of protrusion of the stretch rod. That is, the stroke amount of the blow core mold during ascent or descent becomes relatively large. As a result, the problem occurs that the time taken for ascent or descent of the blow core mold lengthens, resulting in a long cycle time taken by blow molding.

To deal with such a problem, a device is available in which a drive source for the blow core mold or the stretch rod is changed from a pneumatic cylinder to a servo motor to achieve a reduction in the cycle time. A concrete example is a device which is equipped with a first servo motor and a second servo motor, and in which when the second servo motor is stopped, the first servo motor is driven to move a blow core fixing plate and a stretch rod fixing plate forward or backward; or when the first servo motor is stopped, the second servo motor is driven to move the stretch rod fixing plate forward or backward independently (see, for example, Patent Document 2).

By moving the blow core mold and the elevation rod forward or backward (upward or downward), as described above, the time taken for the ascent or descent of the blow core mold and the elevation rod shortens, and can thus reduce the cycle time.

PRIOR ART DOCUMENTS

Patent Documents

Patent Document 1: JP-A-Hei-6-254955
Patent Document 2: Japanese Patent No. 3391904

SUMMARY OF THE INVENTION

Problems to be Solved by the Invention

Even in the device described in Patent Document 2, however, the stretch rod basically needs to be moved (lowered), with the blow core mold being stopped. This poses the problem, as in the device described in Patent Document 1, that the stroke amount of the blow core mold during ascent or descent is large, and the cycle time cannot be sufficiently shortened. Since the first servo motor and the second servo motor are fixed on the same member, moreover, vibrations associated with the ascent or descent of the blow core mold may be transmitted to the motor for driving the stretch rod, causing communication abnormalities. In the biaxial stretch blow molding device operated at a high speed, in particular, if the motion of the stretch rod delays because of a communication abnormality, there is a possibility that the stretch rod will interfere with a movable member including the rotating disk. The influence of such an abnormality is not negligible.

The present invention has been accomplished in the light of the above-described circumstances. It is an object of the invention to provide a biaxial stretch blow molding device which can efficiently move a blow core mold and a stretch rod forward or backward to shorten the cycle time and stabilize a molding action.

Means for Solving the Problems

A first aspect of the present invention, which solves the above problems, resides in a biaxial stretch blow molding device for driving a blow core fixing member to which a blow core mold is fixed, and a stretch rod fixing member to which a stretch rod is fixed, to move forward and backward, comprising: a first guide shaft which is erected on an upper base and to which the blow core fixing member is slidably coupled; a second guide shaft erected on the stretch rod fixing member; a support member fixed to the first guide shaft and provided with a guide hole through which the second guide shaft is slidably inserted; a first drive device that moves the blow core fixing member forward and backward independently of the stretch rod fixing member; and a second drive device that moves the stretch rod fixing member forward and backward independently of the blow core fixing member.

A second aspect of the present invention resides in the biaxial stretch blow molding device according to the first aspect, wherein the second drive device includes a servo motor, and the servo motor is fixed to the support member.

A third aspect of the present invention resides in the biaxial stretch blow molding device according to the second aspect, wherein the second drive device includes a slide shaft linearly moved in an axial direction by rotation of the servo motor, and one end side of the slide shaft is connected to the stretch rod fixing member.

A fourth aspect of the present invention resides in the biaxial stretch blow molding device according to any one of the first to third aspects, wherein the first drive device includes an air cylinder, and the air cylinder is fixed to the upper base.

A fifth aspect of the present invention resides in the biaxial stretch blow molding device according to any one of the first to fourth aspects, wherein the stretch rod fixing member is disposed to contact the blow core fixing member when the stretch rod fixing member is driven to move backward.

Effects of the Invention

According to the biaxial stretch blow molding device of the present invention, the blow core fixing member to which the blow core mold is fixed, and the stretch rod fixing member to which the stretch rod is fixed can be driven to move forward and backward independently. Thus, the blow core fixing member and the stretch rod fixing member can be driven to advance and retreat efficiently at the same timing. Consequently, the time taken for the movement (forward or backward movement) of the blow core fixing member and the stretch rod fixing member can be shortened and, eventually, the cycle time taken for blow molding can be shortened.

MODE FOR CARRYING OUT THE INVENTION

An embodiment of the present invention will now be described in detail by reference to the accompanying drawings.

First of all, an explanation will be offered for the schematic configuration of an injection blow molding apparatus equipped with a biaxial stretch blow molding device.

Figure 1:
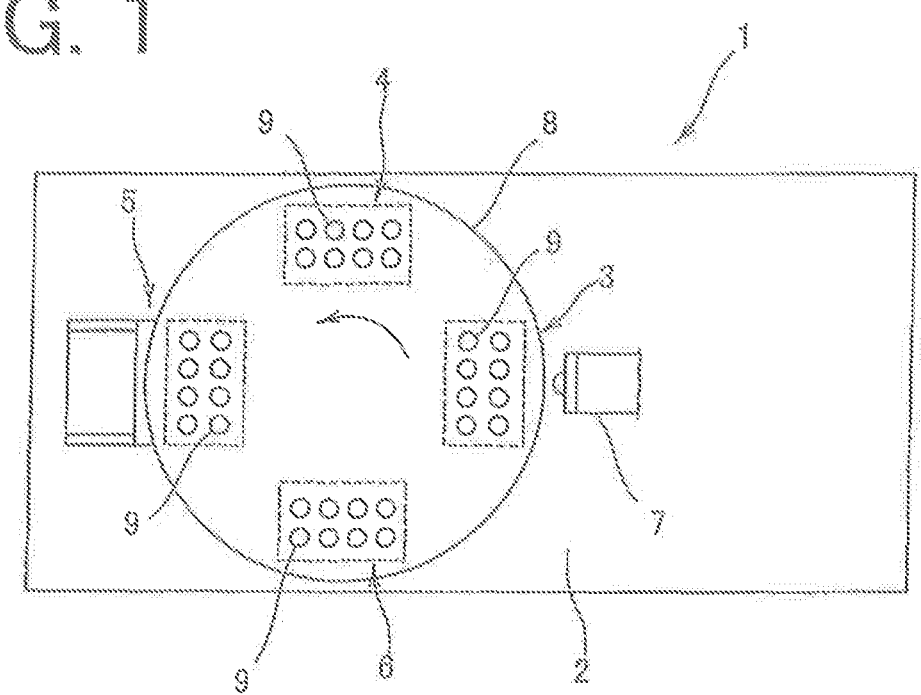
FIG. 1 is a schematic view showing the configuration of an injection blow molding device according to an embodiment of the present invention.

As shown in FIG. 1, an injection blow molding apparatus 1 according to the present embodiment is a so-called one-stage injection blow molding apparatus for producing, for example, a hollow container made of a synthetic resin, such as a bottle for a beverage. An injection molding device (injection molding station) 3, a temperature control device (temperature control station) 4, a biaxial stretch blow molding device (blow molding station) 5, and a withdrawal device (withdrawal station) 6 are provided on a machine base 2 of the injection blow molding apparatus 1.

A nozzle 7 of an injection device is coupled to the injection molding device 3, and a preform is injection-molded in the injection molding device 3. In the temperature control device 4, the temperature of the preform is adjusted to a desired temperature. In the biaxial stretch blow molding device 5, the temperature-adjusted preform is biaxially stretched and blow-molded to form a hollow container which is a final molded product. The so formed hollow container is withdrawn to the outside by the withdrawal device 6.

A rotating disk 8 is provided above the injection molding device 3, the temperature control device 4, the biaxial stretch blow molding device 5, and the withdrawal device 6. The rotating disk 8 is, for example, intermittently rotatable counterclockwise with respect to the machine base 2. Lip molds 9 are provided at four locations in the circumferential direction of the rotating disk 8. With their necks being held by the lip molds 9, the preform and the hollow container are transported to the predetermined devices sequentially by the intermittent rotation of the rotating disk 8.

Figure 2:
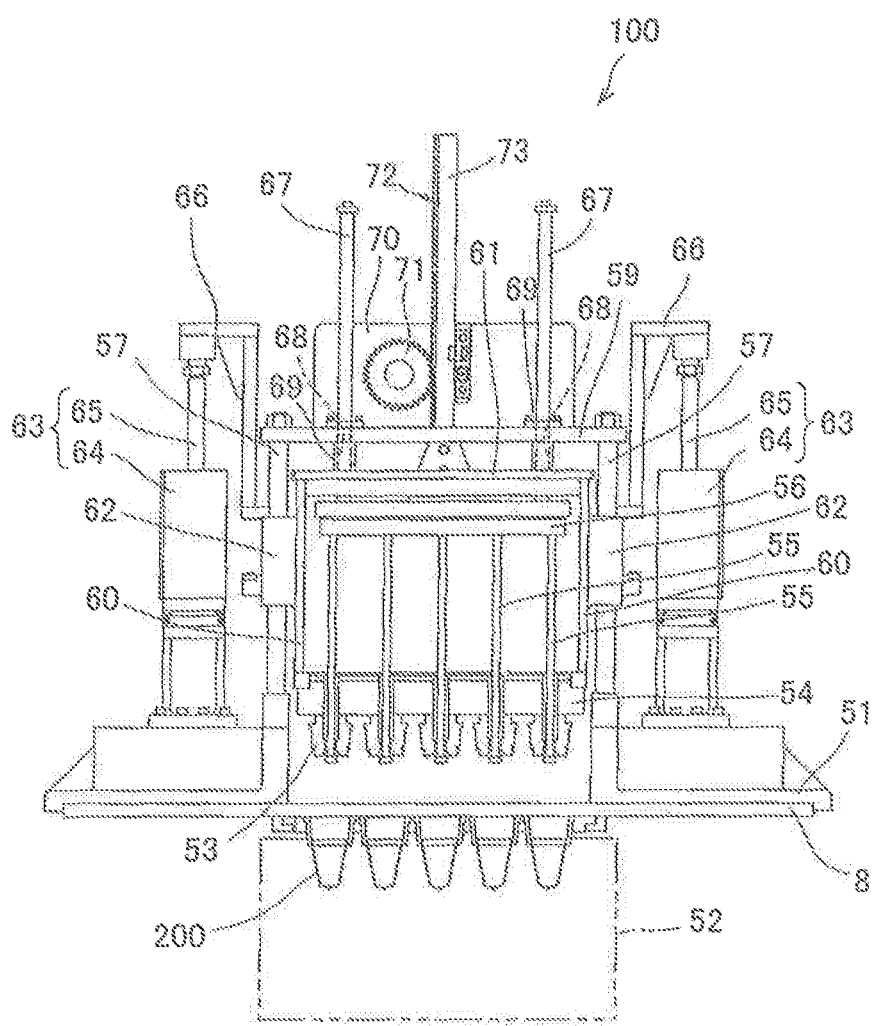
FIG. 2 is a front view showing essential parts of a biaxial stretch blow molding device according to the embodiment of the present invention.
Figure 3:
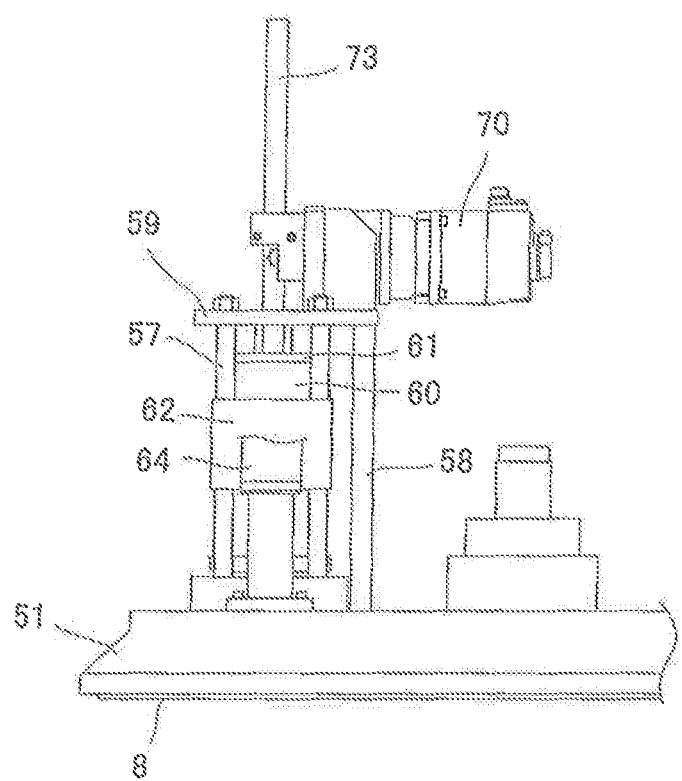
FIG. 3 is a side view showing the essential parts of the biaxial stretch blow molding device according to the embodiment of the present invention.

The present invention is characterized by the configuration of the biaxial stretch blow molding device 5 constituting the above-described injection blow molding apparatus 1. Hereinafter, a detailed description will be presented of the configuration of the biaxial stretch blow molding device 5, particularly, a drive mechanism unit for driving a blow core fixing plate, to which a blow core mold for closing a mouth (opening) of the preform is fixed, and a stretch rod fixing plate, to which a stretch rod is fixed, to advance and retreat (ascend and descend) with respect to a blow cavity mold. FIG. 2 is a front view showing essential parts of the biaxial stretch blow molding device 5, particularly, the configuration of the drive mechanism unit. FIG. 3 is a side view of the drive mechanism unit.

As shown in FIGS. 2 and 3, the biaxial stretch blow molding device 5 has a blow cavity mold 52 below an upper base 51. Since the blow cavity mold 52 is of an existing configuration, its detailed explanation and illustration will be omitted. Briefly, the blow cavity mold 52 includes a pair of split molds and, at a position thereof corresponding to each lip mold 9, is formed with a molding space (cavity) conformed to the shape of the hollow container as the final molded product.

A blow core fixing plate (blow core fixing member) 54 to which a blow core mold 53 is fixed, and a stretch rod fixing plate (stretch rod fixing member) 56 to which a stretch rod 55 is fixed are provided above the upper base 51 of the biaxial stretch blow molding device 5. A drive mechanism unit 100 is further provided for moving the blow core fixing plate 54 and the stretch rod fixing plate 56 forward and backward. The term "moving forward and backward" or a similar term means moving the blow core fixing plate 54 and the stretch rod fixing plate 56 to advance toward the blow cavity mold 52, and moving them to retreat away from the blow cavity mold 52.

To the blow core fixing plate 54, the respective blow core molds 53 are fixed at positions corresponding to the plurality of lip molds 9. The blow core fix plate 54 can be moved forward and backward with respect to the blow cavity mold 52 and, in the present embodiment, are movable upward and downward (ascendable and descendable), by the drive mechanism unit 100.

Concretely, on the upper base 51, a pair of first guide shafts 57 is erected on each of both sides, with the blow core fixing plate 54 being located therebetween. That is, two of the first guide shafts 57 are arranged in parallel on each side of the blow core fixing plate 54, so that a total of the four first guide shafts 57 are erected on the upper base 51. A plate-shaped reinforcing frame 58 is provided behind the first guide shaft 57 (on the right side in FIG. 3). A support member 59 is fixed to the distal ends (upper ends) of the four first guide shafts 57 and the reinforcing frame 58.

Side plates 60 are provided at both ends of the blow core fixing plate 54. These side plates 60 are each provided opposite the two first guide shafts 57 arranged in parallel, and their lower ends are fixed to the blow core fixing plate 54. The upper ends of the side plates 60 are coupled together by a coupling plate 61 disposed in parallel to the blow core fixing plate 54. A slide member 62 mounted slidably on the opposing two first guide shafts 57 is fixed to each side plate 60. That is, the blow core fixing plate 54 is coupled slidably to the first guide shafts 57 via the side plates 60 and the slide members 62.

Air cylinders 63, as a first drive device that moves the blow core fixing plate 54 forward and backward, are provided outwardly of the pair of first guide shafts 57. That is, the blow core fixing plate 54 is movable by the two air cylinders 63. These air cylinders 63 are each composed of a cylinder portion 64 fixed to the upper base 51, and a drive rod 65 to be driven vertically by the cylinder portion 64. The distal end of the drive rod 65 is coupled to a lower surface of an extension member 66 extended from the slide member 62 to a position opposing the drive rod 65. In this manner, the air cylinder 63 is coupled to the blow core fixing plate 54 via the extension member 66, the slide member 62, and the side plate 60.

With the foregoing configuration of the drive mechanism unit 100, the air cylinder 63 is driven to move the drive rod 65 upward (i.e. advance it) by a rise in the air pressure within the cylinder portion 64. In accordance with this movement, the extension member 66 is pressed upward, and the blow core fixing plate 54 is moved upward along the first guide shafts 57 together with the extension member 66. When the air cylinder 63 is driven to move the drive rod 65 downward (i.e., retreat it), by contrast, the blow core fixing plate 54 is moved downward together with the extension member 66.

On the other hand, a plurality of the stretch rods 55 corresponding to the plurality of blow core molds 53 each have one end (upper and) fixed to the stretch rod fixing plate 56. The other end (lower end) side of each stretch rod is inserted into the blow core mold 53 via a through-hole (not shown) formed in the blow core fixing plate 54. The stretch rod fixing plate 56 is disposed below the aforementioned coupling plate 61 and, like the blow core fixing plate 54, is configured to be movable forward and backward with respect to the blow cavity mold 52 and, in the present embodiment, be movable upward and downward (ascendable and descendable), by the drive mechanism unit 100.

Concretely, on a surface of the stretch rod fixing plate 56 on a side opposite to the stretch rods 55 (i.e., upper surface of the stretch rod fixing plate 56), second guide shafts 67 are erected near both ends of the surface. These paired second guide shafts 67 are extended upwardly of the support member 59. The coupling plate 61 disposed above the stretch rod fixing plate 56 is formed with a first opening (not shown) of such a size that the second guide shaft 67 does not contact the first opening. The support member 59 is provided with guide holes 68 through which the second guide shafts 67 are inserted slidably to guide the movement of the second guide shafts 67. In the present embodiment, the guide hole 68 is constituted by a cylindrical guide hole formation member 69 of a length larger than the thickness of the support member 59, and this guide hole formation member 69 is attached to the support member 59.

The guide hole formation member 69 is attached to the support member 59 so as to protrude downwardly of the support member 59 by a predetermined amount. When the blow core fixing plate 54 is raised, the coupling plate 61 contacts the guide hole formation member 69, thereby restraining the ascent of the blow core fixing plate 54. That is, in the present embodiment, the upper limit position (standby position) of the blow core fixing plate 54 is determined by the guide hole formation member 69.

Needless to say, the configuration for determining the upper limit position of the blow core fixing plate 54 is not particularly limited. A stopper member for restraining the upward movement of the blow core fixing plate 54 may be provided separately from the guide hole formation member 69. This stopper member may be provided, for example, in a part of the upper surface of the coupling plate 61 which the second guide shaft 67 does not penetrate, or may provided on the lower surface of the support member 59.

A servo motor 70 constituting a second drive device that moves the above-mentioned stretch rod fixing plate 56 to advance or retreat is fixed onto the support member 59. A drive gear 71 is fixed to a rotating shaft of the servo motor 70, and a stretch rack (slide shaft) 73 having on one surface side thereof a gear portion 72 to be meshed with the drive gear 71 is provided in a predetermined length on the stretch rod fixing plate 56. The coupling plate 61 and the support member 59 disposed above the stretch rod fixing plate a 56 are each formed with a second opening (not shown) of such a size that the stretch rack 73 does not contact the second opening.

In the foregoing configuration of the drive mechanism unit 100, when the servo motor 70 is driven to rotate the drive gear 71 in mesh with the gear portion 72 of the stretch rack 73 in one direction (counterclockwise in FIG. 2), the stretch rack 73 is move upward in accordance with this rotation. That is, the stretch rod fixing plate 56 to which the stretch rack 73 is fixed is moved upward along the second guide shafts 67. When the servo motor 70 is driven to rotate the drive gear 71 in the other direction (clockwise in FIG. 2), by contrast, the stretch rod fixing plate 56 is moved downward along the second guide shafts 67 in accordance with this rotation.

According to the biaxial stretch blow molding device 5 equipped with the drive mechanism unit 100 of the above configuration, the blow core fixing plate 54 and the stretch rod fixing plate 56 can be moved forward and backward efficiently, and the cycle time taken for blow molding can be shortened.

Figure 4:
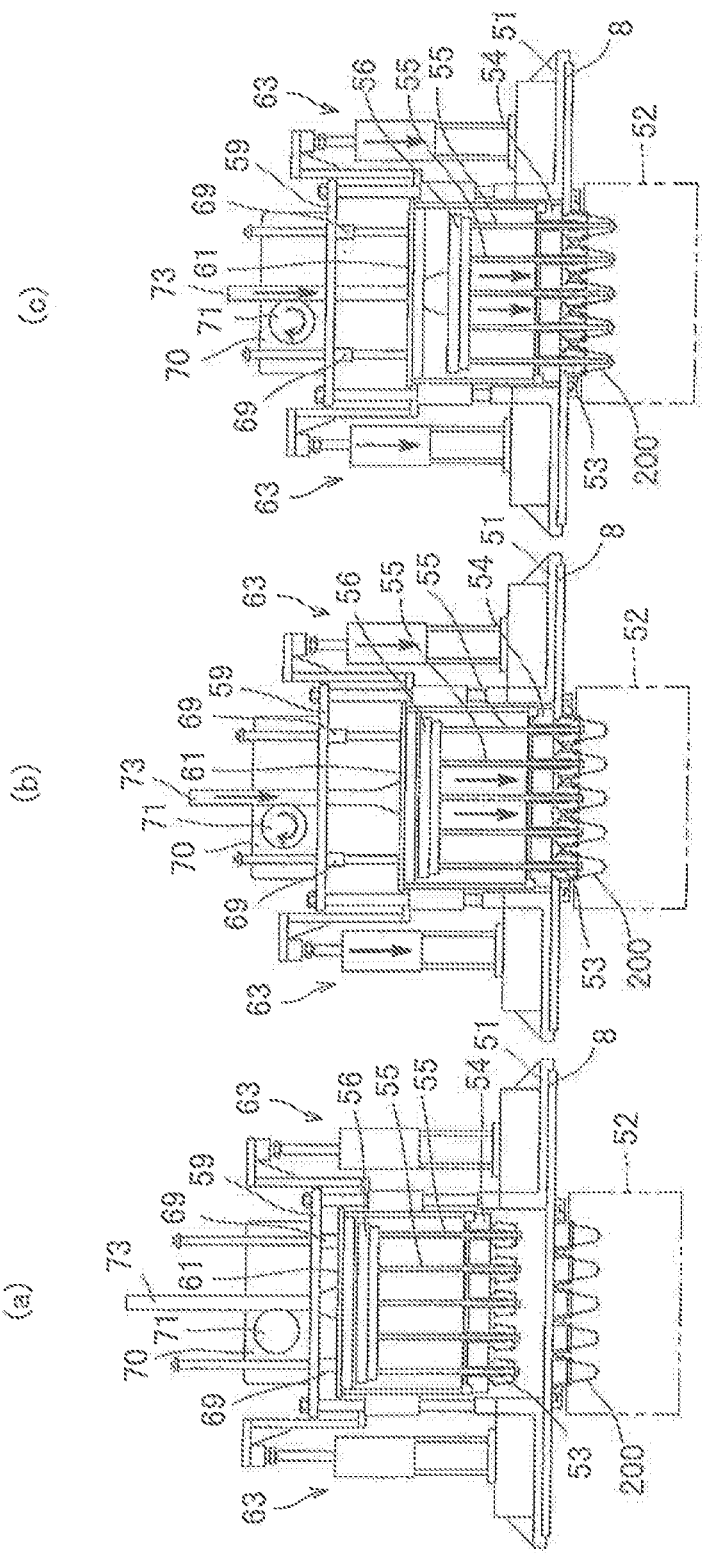
FIGS. 4(a) to 4(c) are views illustrating the actions of the biaxial stretch blow molding device according to the embodiment of the present invention.

Next, an example of the actions of the blow core fixing plate 54 and the stretch rod fixing plate 56 will be described by reference to FIGS. 4(*a*) to 4(*c*) and 5(*a*) to 5(*c*).

When a preform 200 is transported to the blow cavity mold 52 of the biaxial stretch blow molding device 5, as shown in FIG. 4(a), the blow core fixing plate 54 is raised by the air cylinder 63, whereby the blow core mold 53 is held at a position where it does not interfere with the rotating disk 8. In the present embodiment, the blow core fixing plate 54 is held at the standby position where the coupling plate 61 contacts the guide hole formation member 69. At this time, the stretch rod 55 has its distal end (lower end) held in such a state as to be on a par with, or slightly protrude from, the lower end of the blow core mold 53. In other words, the stretch rod 55 is held in such a state that its distal end (lower end) scarcely protrudes from the lower end of the blow core mold 53. Thus, with the blow core fixing plate 54 being located at the standby position, the blow core mold 53 is disposed at a position relatively close to the blow cavity mold 53 (preform 200).

Then, as shown in FIG. 4(b), the air cylinder 63 is driven to move the drive rod 65 downward (retreat it). As a result, the blow core fixing plate 54 descends along the first guide shafts 57. The blow core fixing plate 54 lowers each blow core mold 53 to a position where the blow core mold 53 seals the mouth of the preform 200.

At the same timing as that for lowering the blow core fixing plate 54, the servo motor 70 is driven to rotate the drive gear 71 in a predetermined direction (clockwise in FIGS. 4(b), 4(c). By so doing, the stretch rod fixing plate 56 descends together with the stretch rack. The stretch rod fixing plate 56 is lowered to a position where the distal end of the stretch rod 55 comes close to the bottom of the preform 200.

For convenience of explanation, FIG. 4(b) shows a state in which the blow core fixing plate 54 is lowered, and FIG. 4(c) shows a state in which the stretch rod fixing plate 56 is further lowered. Actually, however, the blow core fixing plate 54 and the stretch rod fixing plate 56 are lowered at the same timing, as mentioned above. That is, during the descent of the blow core fixing plate 54, the stretch rod fixing plate 56 is also lowered.

In the present embodiment, as described above, the air cylinder 63 as the first drive device that moves the blow core fixing plate 54 forward and backward is fixed to the upper base 51, whereas the servo motor 70 constituting the second drive device that moves the stretch rod fixing plate 56 forward and backward is fixed to the support member 59. That is, the air cylinder 63 and the servo motor 70 are fixed independently of each other, and one of them does not affect the action of the other. Hence, the air cylinder 63 and the servo motor 70 can be operated at the same timing. Moreover, an encoder and wiring of the servo motor 70 are configured not to undergo vibrations or impulses associated with the ascent or descent motion of the blow core fixing plate 54, and associated communication abnormalities are also inhibited from occurring. Consequently, the synchronous operation of the biaxial stretch blow molding device 5, for example, the synchronous operation of the rotating disk 8 and the stretch rod fixing plate 56, can be carried out more reliably, thus enhancing the stability of mechanical actions (molding actions) during blow molding.

The "same timing" means that there is a period of time during which the stretch rod fixing plate 56 and the blow core fixing plate 54 move simultaneously, and the servo motor 70 and the air cylinder 63 need not necessarily be started at the same time. The timing for starting the servo motor 70 and the air cylinder 63 may be determined, as appropriate, in consideration of the ascent speeds of the stretch rod fixing plate 56 and the blow core fixing plate 54, respectively, so that the descent of the stretch rod fixing plate 56 ends during the descent of the blow sore fixing plate 54.

Figure 5:
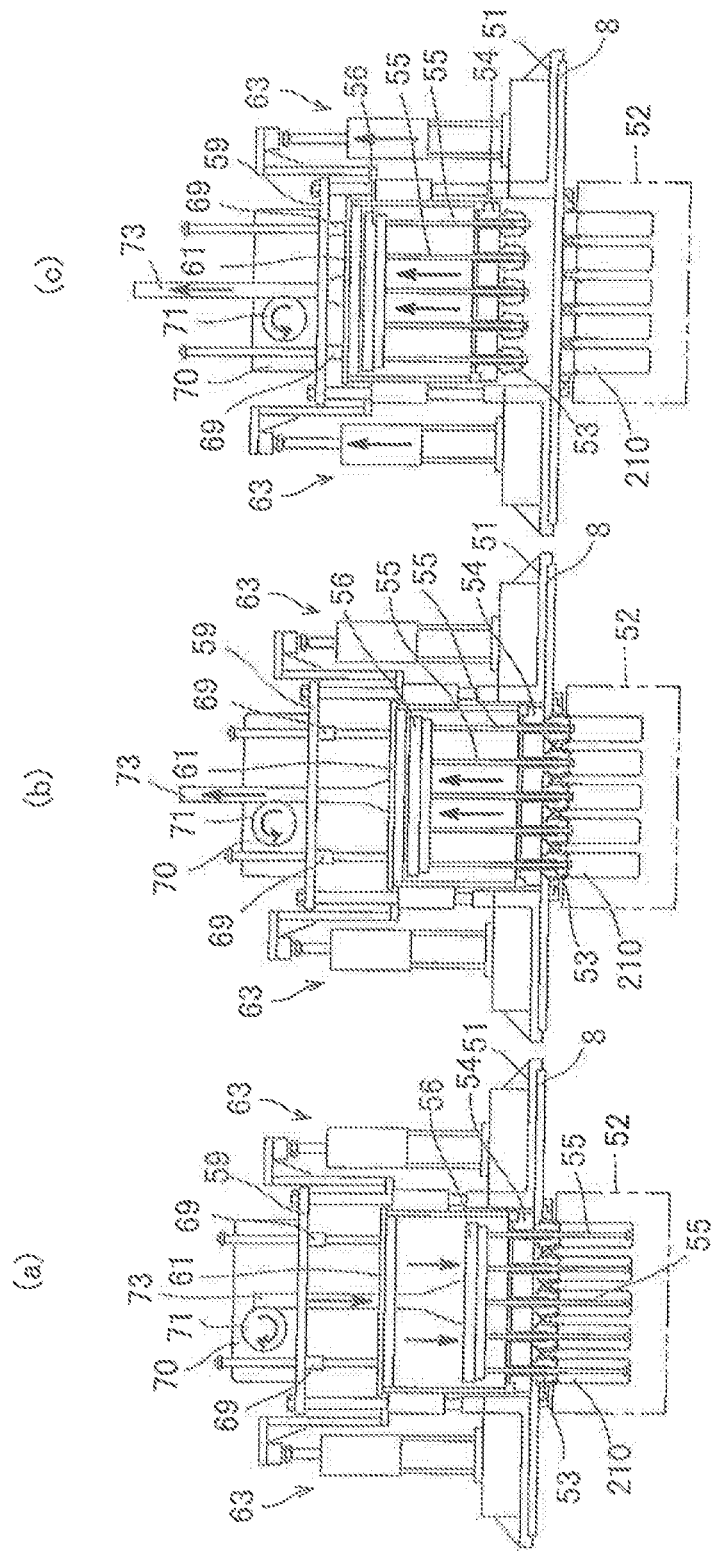
FIGS. 5(a) to 5(c) are views illustrating the actions of the biaxial stretch blow molding device according to the embodiment of the present invention.

As shown in FIG. 5(a), the servo motor 70 is driven to rotate the drive gear 71 in a predetermined direction (clockwise in FIG. 5(a)) to further lower the stretch rod 55. At the same time, high pressure air is supplied into the preform 200 via the blow core mold 53 to blow-mold the preform 200, thereby forming a hallow container 210 of a predetermined shape.

Then, as shown in FIG. 5(b), the servo motor 70 is driven to rotate the drive gear 71 in a predetermined direction (counterclockwise in the drawing) to raise the stretch rod fixing plate 56. At practically the same timing as that for the ascent of the stretch rod fixing plate 56, the air cylinder 63 is driven to raise the blow core fixing plate 54. The timing for raising the blow core fixing plate 54 is preferably at least before contact of the stretch rod fixing plate 56 with the coupling plate 61, more preferably simultaneous with the ascent of the stretch rod fixing plate 56.

According to the above procedure, until the stretch rod fixing plate 56 contacts the coupling plate 61, the stretch rod fixing plate 56 and the blow core fixing plate 54 ascend independently of each other. After the stretch rod fixing plate 56 contacts the coupling plate 61, the stretch rod fixing plate 56 and the blow core fixing plate 54 ascend in synchronization, as shown in FIG. 5(c). On this occasion, the blow core fixing plate 54 is pushed up even by the stretch rod fixing plate 56, that is, the blow core fixing plate 54 is raised by the driving force of the servo motor 70 as well as the air cylinder 63. Thus, the blow core fixing plate 54 and the stretch rod fixing plate 56 can be raised to the standby position at an earlier stage.

Under certain molding conditions such as the production of a wide-mouthed container, the blow core mold 53 may be tightly fitted to the neck of the preform 200, and the ascent motion of the blow core mold 53 may be delayed by the action of the air cylinder alone. In such a case, the biaxial stretch blow molding device 5 according to the present invention can suppress a delay in the motion of the blow core mold 53 by assisting the ascending motion of the blow core fixing plate 54 by the force of the servo motor 70 via the stretch rod fixing plate 56.

When the blow core fixing plate 54 and the stretch rod fixing plate 56 ascend to the standby position, the air cylinder 63 and the servo motor 70 are stopped, whereby the motions of the blow core fixing plate 54 and the stretch rod fixing plate 56 during blow molding (one cycle) are completed.

With the biaxial stretch blow molding device 5 according to the present invention, as described above, the stretch rod fixing plate 56 can also be lowered independently during the descent of the blow core fixing plate 54. Thus, the stretch rod 55 need not be protruded, at the standby position, from the blow core mold 53 in conformity with the length of the preform. Hence, the distance between the blow core mold 53 and the preform at the standby position can be rendered relatively short, and the stroke amount of the blow core mold 53 can be kept small. Accordingly, the time required for lowering the blow core mold 53 is short, and the cycle time is shortened.

Furthermore, when the blow core fixing plate 54 is raised, the power of the servo motor 70 as well as the air cylinder 63 is utilized. Thus, the necessary time for raising the blow core fixing plate 54 and the stretch rod fixing plate 56 to the standby position is also shortened. Hence, the cycle time taken for blow molding can be shortened further.

The one embodiment of the present invention has been described as above, but it is to be understood that the present invention is in no way limited to this embodiment. The present invention can be changed or modified, as appropriate, without departing from its spirit and scope.

EXPLANATIONS OF LETTERS OR NUMERALS

1 Injection blow molding apparatus
2 Machine base
3 Injection molding device
4 Temperature control device
5 Biaxial stretch blow molding device
6 Withdrawal device
7 Nozzle
8 Rotating disk
9 Lip mold
51 Upper base
52 Blow cavity mold
53 Blow core mold
54 Blow core fixing plate
55 Stretch rod
56 Stretch rod fixing plate
57 First guide shaft
58 Reinforcing frame
59 Support member
60 Side plate
61 Coupling plate
62 Slide member
63 Air cylinder
64 Cylinder portion
65 Drive rod
66 Extension member
67 Second guide shaft
68 Guide hole
69 Guide hole formation member
70 Servo motor
71 Drive gear
72 Gear portion
73 Stretch rack
100 Drive mechanism unit
200 Preform
210 Hollow container

The invention claimed is:

1. A biaxial stretch blow molding device for driving a blow core fixing member to which a blow core mold is fixed, and a stretch rod fixing member to which a stretch rod is fixed, to move forward and backward, comprising:
   a first guide shaft which is erected on an upper base and to which the blow core fixing member is slidably coupled;
   a second guide shaft erected on the stretch rod fixing member;
   a support member fixed to the first guide shaft and provided with a guide hole through which the second guide shaft is slidably inserted;
   a first drive device that moves the blow core fixing member forward and backward independently of the stretch rod fixing member; and
   a second drive device that moves the stretch rod fixing member forward and backward independently of the blow core fixing member.

2. The biaxial stretch blow molding device according to claim 1, wherein
   the second drive device includes a servo motor, and
   the servo motor is fixed to the support member.

3. The biaxial stretch blow molding device according to claim 2, wherein
   the second drive device includes a slide shaft linearly moved in an axial direction by rotation of the servo motor, and
   one end side of the slide shaft is connected to the stretch rod fixing member.

4. The biaxial stretch blow molding device according to claim 1, wherein
   the first drive device includes an air cylinder, and
   the air cylinder is fixed to the upper base.

5. The biaxial stretch blow molding device according to claim 2, wherein
   the first drive device includes an air cylinder, and
   the air cylinder is fixed to the upper base.

6. The biaxial stretch blow molding device according to claim 3, wherein
   the first drive device includes an air cylinder, and
   the air cylinder is fixed to the upper base.

7. The biaxial stretch blow molding device according to claim 1, wherein
   the stretch rod fixing member is disposed to contact the blow core fixing member when the stretch rod fixing member is driven to move backward.

8. The biaxial stretch blow molding device according to claim 2, wherein
   the stretch rod fixing member is disposed to contact the blow core fixing member when the stretch rod fixing member is driven to move backward.

9. The biaxial stretch blow molding device according to claim 3, wherein
   the stretch rod fixing member is disposed to contact the blow core fixing member when the stretch rod fixing member is driven to move backward.

10. The biaxial stretch blow molding device according to claim 4, wherein
    the stretch rod fixing member is disposed to contact the blow core fixing member when the stretch rod fixing member is driven to move backward.

11. The biaxial stretch blow molding device according to claim 5, wherein
    the stretch rod fixing member is disposed to contact the blow core fixing member when the stretch rod fixing member is driven to move backward.

12. The biaxial stretch blow molding device according to claim 6, wherein
    the stretch rod fixing member is disposed to contact the blow core fixing member when the stretch rod fixing member is driven to move backward.

* * * * *